US012381365B2

(12) United States Patent
Morgan

(10) Patent No.: US 12,381,365 B2
(45) Date of Patent: Aug. 5, 2025

(54) BRUSH WEAR INDICATOR

(71) Applicant: ALEXSAVA Holdings Limited, St Peter Port (GG)

(72) Inventor: Anthony L. Morgan, Port Talbot (GB)

(73) Assignee: ALEXSAVA Holdings Limited, St Peter Port (GG)

( * ) Notice: Subject to any disclaimer, the term of this patent is extended or adjusted under 35 U.S.C. 154(b) by 200 days.

(21) Appl. No.: 18/032,224

(22) PCT Filed: Sep. 16, 2021

(86) PCT No.: PCT/GB2021/052411

§ 371 (c)(1),
(2) Date: Apr. 17, 2023

(87) PCT Pub. No.: WO2022/079405

PCT Pub. Date: Apr. 21, 2022

(65) Prior Publication Data

US 2023/0411914 A1 Dec. 21, 2023

(30) Foreign Application Priority Data

Oct. 15, 2020 (GB) ..................................... 2016367

(51) Int. Cl.
*H01R 39/58* (2006.01)
*H01R 39/38* (2006.01)

(52) U.S. Cl.
CPC ........... *H01R 39/58* (2013.01); *H01R 39/381* (2013.01)

(58) Field of Classification Search
CPC ...... H01R 39/58; H01R 39/381; H01R 39/38; H01R 13/6683; H01R 39/385; G01B 11/14
See application file for complete search history.

(56) References Cited

U.S. PATENT DOCUMENTS

2013/0218514 A1* 8/2013 Schieke ................. H01R 39/58 702/158
2014/0265675 A1 9/2014 Cutsforth
(Continued)

FOREIGN PATENT DOCUMENTS

JP 2018074851 A 5/2018

OTHER PUBLICATIONS

International Search Report and Written Opinion for Application No. PCT/GB2021/052411 mail date Apr. 21, 2022, 4 pages.
(Continued)

*Primary Examiner* — Tulsidas C Patel
*Assistant Examiner* — Mohammed Ahmed Qureshi
(74) *Attorney, Agent, or Firm* — Maine Cernota & Curran

(57) ABSTRACT

Disclosed herein is a brush wear indicator comprising and brush (3) moveable within a holder (2). The brush (3) is urged against a collector surface (10) of a rotor by a spring (4) which is mounted to a bracket (6) supported by the holder (2). A proximity sensor (5) is mounted to either a) the spring (4) or the brush (3), or b) a non-moveable part of the indicator which includes the bracket and configured to determine the distance to a) the non-moveable parts or b) the spring (4) or brush (3), respectively. The proximity sensor (5) in electrical communication with a CPU configured to determine the amount of wear that has occurred to the at least one brush (3) depending on the distance determined by the sensor (5) between the spring (4) or the brush (3) and the non-moveable parts.

13 Claims, 1 Drawing Sheet

(56) References Cited

U.S. PATENT DOCUMENTS

| | | | | |
|---|---|---|---|---|
| 2015/0357778 A1* | 12/2015 | Steinbach | .............. | H02K 13/00<br>310/242 |
| 2015/0357779 A1 | 12/2015 | Steinbach | | |
| 2016/0352058 A1 | 12/2016 | Cutsforth | | |

OTHER PUBLICATIONS

International Preliminary Report on Patentability for Application No. PCT/GB2021/052411 mail date Apr. 27, 2023, 11 pages.

GB Search Report for GB Application No. GB2016367.1 mail date Dec. 24, 2020, 3 pages.

* cited by examiner

BRUSH WEAR INDICATOR

RELATED APPLICATIONS

This application is a national phase application filed under 35 USC § 371 of PCT Application No. PCT/GB2021/052411 with an international filing date of Sep. 16, 2021, which claims priority of GB Patent Application 2016367.1 filed Oct. 15, 2020. Both of these applications are incorporated herein by reference in their entirety for all purposes.

FIELD OF THE INVENTION

The present invention relates to a brush wear indicator

BACKGROUND TO THE INVENTION

An electrical brush or "carbon brush" as it is known, is an electrical contact which conducts current between stationary wires and moving parts, most commonly in a rotating collector surface. Typical applications include electric motors, alternators and electric generators. They can also be used to sense the speed of rotation of the collector surface in instances where for example the collector surface has magnets embedded within it and the brush transmits the fluctuations in current as the magnet rotates. It is also possible to transmit information in the form of electrical current from the rotating part to the static part and vice versa through the brush. Thus brushes can be used to transmit data from a rotating part to a static part and vice versa. The data may include such factors as number of revolutions, speed of the collector surface, or other data transmitted through the collector surface using the collector surface as a conduit.

Originally, in electric motors, for the coils of the rotor to be connected to a complete electrical circuit, a copper or brass commutator or 'slip ring was affixed to the collector surface, with springs pressing braided copper wire 'brushes' onto the rings which conducted the current. Such brushes provided poor commutation as they moved from one commutator segment to the next. The cure was the introduction of electrical 'high resistance brushes' which are typically made from graphite (sometimes with added copper). Although the resistance was of the order of tens of milliohms, they were high resistance enough to provide a gradual shift of current from one commutator segment to the next. This is the origin of the term brush which remains in use today.

The main issue with modern brushes is that they wear out as they are designed to contact a rotating collector surface of some kind. Since the brushes are in contact with the commutator or rotor, they must be periodically replaced after a predetermined amount of wear to assure adequate current conduction and to prevent damage to the commutator/rotor. Whilst some brushes can be replaced easily, others in more complex machines cannot, or not without significant expenditure. Off-shore wind turbines for example, use electric motors to alter the pitch angle of the blades. Brushes are involved to control the current to the blade motors, but when they wear out the wind turbine has to be put out of action temporarily and the brushes replaced. This requires an engineer to sail out to the wind turbine in question and perform the required maintenance operation. This takes considerable time and is a very expensive operation.

There is a need to be able to predict when electrical brushes require maintenance, to prevent excessive or unexpected machine operating time loss. Present solutions include visual indicators or some form of physical contact switch, but these are plagued with issues caused by dirt etc.

U.S. Pat. No. 8,384,266B2 describes a device which has a sensor placed within the brush itself as described in. This however requires the manufacture of special brushes which is costly and compromises the strength of the brush itself. Furthermore these devices only indicate wear when the conductive wires used within the sensor start to be degraded. As the wires are buried deep within the brush, there is no indication of wear rate early on in the lifespan of the brush. Furthermore, if the brush was to stop functioning for some reason perhaps due to breakage early in its lifetime, it is still possible that this would not be registered by the wires.

There has now been devised a brush wear indicator which overcomes and/or substantially mitigates the above referenced and/or other disadvantages associated with the prior art.

SUMMARY OF THE INVENTION

In an aspect of the invention there is provided a brush wear indicator comprising:

a brush holder, at least one brush located within the brush holder, at least one spring in contact with the at least one brush and configured to bias the brush against an electrically conductive collector surface, the spring and the brush being moveable in use, a proximity sensor mounted to either a) the spring or the brush, or b) a non-moveable part of the indicator and configured to determine the distance to the non-moveable parts or the spring or brush, respectively, the non-moveable part including a bracket supported by the holder, the proximity sensor in electrical communication with a CPU configured to determine the amount of wear that has occurred to the at least one brush depending on the distance determined by the sensor between the spring or the brush and the non-moveable parts.

The brush wear indicator according to the invention is advantageous primarily because as the brush wears with use as it bears against the collector surface the sensor is able to determine the change in distance between the moving parts (such as the spring or brush) and the non-moveable parts (such as the bracket). This information is communicated to the CPU which determines the amount of wear the brush has undergone. Data on the indicated wear can then be transmitted to a remote receiver, which enables the user to monitor the wear of the brush from a remote location. Alternatively, data on the indicated wear can then be collated by the CPU and made available locally, for example by a machine mounted USB port. When access to the unit (which may be a generator, motor or rotor) the brush is mounted to is difficult or expensive, then it enables to user to plan and organise maintenance programs to make the best use of time and effort. It also avoids units being offline for too long, because instead of getting to unit failure, the user can predict when the brush is near the end of its lifespan, and replace the brush without the unit being taken out of service. A further advantage of the invention is that it enables the user to compare brush wear data against other parameters, for example in a wind turbine, the turbine generator output, wind speed, climatic conditions etc. This helps the user to optimise the brush grade for the specific conditions and environments.

The at least one spring is defined as being in contact with the at least one brush. This may be direct or indirect contact.

For example, the end of the at least one spring may contact directly the at least one brush. Alternatively, the at least one brush may be mounted on a support or pressure finger and the at least one spring is directly in contact with said support or pressure finger, and therefore indirectly in contact with the at least one brush. This the case for example in calliper type brushes.

The spring is described as being movable in use. This means that a substantial amount of the spring moves in use, but not all of it. It will be appreciated that the spring is required to be mounted to the bracket and therefore the portion of the spring mounted to the bracket does not move in use. However, as the spring biases the brush against an electrically conductive collector surface it will be appreciated that a considerable portion of the spring will move in use.

Preferably the proximity sensor and/or the at least one spring are mounted on the bracket. This makes it easy to move the two out of the way in one go when the brush is required to be replaced.

Preferably the bracket is attachable to the holder. This makes the bracket capable of being mounted in the correct position and provided as a separate part.

For the bracket to be supported by the holder the bracket may clip onto a portion of the holder not in contact with the brush. This still allows the brush to move as it is worn away in use. The bracket may comprise a portion having two resiliently deformable arms configured to engage around a wall of the holder. Thus the bracket may comprise a portion in the form of a clip which clips over the edge wall of the holder to hold the bracket in place. This allows the bracket to be releasably engaged with the holder and also means that the bracket doesn't interfere with the movement of the brush as it wears. Preferably the bracket comprises a resiliently deformable portion mounted between inside surfaces of the holder. This allows for the bracket to be releasably fixed into a gap formed between the inside of one side of the holder and inside of another side of the holder. Given that holders are commonly formed with pockets it allows the bracket to be fitted into one pocket whilst the brush is fitted into a separate pocket. The fix may be made semi-permanent by part of the resiliently deformable portion having a protrusion which fits into a recess in the holder when the bracket is engaged into position. Alternatively, the recess may be on the resiliently deformable portion and the protrusion on the holder. In use the resiliently deformable portion deflects as the bracket is introduced into the holder until the recess and the protrusion engage, at which point the resilient nature forces a tight fit of the two parts together. This type of engagement has the added benefit that it holds the bracket extremely secure within the holder. To remove the bracket the resiliently deformable portion is deflected thereby disengaging the protrusion from the recess and allowing removal of the bracket. In some examples, where the holder is a tandem holder or there are two holders in relatively close proximity to one another, the bracket may have two ends with one end clipping into one holder in the manner as described above and the opposite end clipping into the neighbouring holder also in the manner described above. To facilitate this the bracket will be made from resiliently deformable material to allow it to bend sufficiently so that it can engage between neighbouring holders. The portion of the bracket between the neighbouring holders is therein a non-movable part and can house the sensor which is pointed to either of the brushes or either of the springs mounted to the brackets and which bear against the brushes.

Preferably the sensor is directed at either the spring or the brush. Alternatively, when in a different mounting position on the brush, preferably the sensor is directed to the bracket.

The spring may be any of a coil spring, a constant force spring, a "V" shaped clip spring, a bayonet spring, a sugar tong spring, a bobbin spring, a helical spring, a torsion spring, a calliper spring, a clock spring or cassette mechanism spring. Preferably the proximity sensor is any of a laser sensor or ultrasound sensor. This provides the most accurate distance measure and is relatively unaffected or subject to interference by dirt or dust.

Preferably the brush is a carbon brush. Preferably when the brush is carbon it will comprise a metal to increase conductivity.

Suitable brushes therefore include but are not limited to electrographite brushes, metal graphite brushes, including copper graphite, silver graphite, metal hybrid graphite such as bronze graphite brushes, brass graphite brushes, or silver: copper graphite brushes, metal impregnated brushes, where the metal is typically copper or silver, natural graphite, resin bonded brushes, hard carbon brushes, carbon graphite brushes, dual grade brushes, sandwich brushes, or insert brushes.

Preferably the brush is any of a monobloc brush, multiwafer brush, multipart brush, split brush, wire brush, calliper brush or fibre brush.

Preferably the holder is any of a radial holder, trailing holder, reaction holder, tandem holder, cantilever holder, cartridge holder or calliper holder. The in the case of a calliper holder which uses a calliper arrangement for the brushes, the brushes are connected to pivotal support arms. One or more springs are connected between the arms and bias arms towards each other which consequently biases the brushes into contact with the collector surface. As stated above, the proximity sensor is mounted to either) the spring or the brush, or b) a non-moveable part of the indicator and configured to determine the distance to the non-moveable parts or the spring or brush, respectively. However in the case of a calliper brush, the proximity sensor could be mounted to one or both of the supporting arms and is configured to determine the distance from the sensor to a non-moveable part of the indicator. The reverse is also possible. The proximity sensor could be mounted to a non-moveable part of the of the indicator and configured to determine the distance from the sensor to one or more of the support arms.

The collector surface may be a linear collector surface or a rotating collector surface. Examples of linear collector surfaces include but are not limited to train track collector surfaces, tram track collector surfaces, cable collector surfaces, crane collector surfaces or track collector surfaces. With track collector surfaces the collector is typically formed into a retaining channel (such as a U or V shaped Channel) or bearing surface (such as a bearing track) and the brush rides within said channel or on said bearing surface. In both examples it may also be that the retaining channel or bearing surface move and the brush remains static. In other words, the movement of the brush with respect to the collector is relative. Examples of rotating collector surfaces include but are not limited to rotating plates, shafts, shaft ends, axles, circular collectors or commutators. Examples of typical shafts include but are not limited to drive shafts, perhaps on a ship or car. Examples of suitable axles include but are not limited to car axles or train axles or wind turbine axles. For rotatable collector surfaces, the collector surface is generally circular but may have flat portions around the circumference for example in pancake or face plate motors or slip rings. The collector surface may also be an earthing collector surface, grounding collector surface or stub axle, for example on a rail bogie. Therefore the collector surface may be moveable or static. For example, the indicator may be attached to a moving object and the indicator is configured such that the brush wears against the collector surface which is static. Vice versa applies here also. Electrical information is passed through the connection which is created. Such information might include the speed of the train or messages from the station hub transmitted through the train collector surface to the train carriage via the indicator.

The non-moveable part may also include the holder. Therefore, the sensor may be attached to the holder and directed to the moving parts, i.e. the spring or the brush. This is more difficult to arrange though within the physical environment of the indicator, but for some applications it is the best option.

The sensor may be removably attached to the bracket. Brackets and springs may need to be replaced from time to time. This feature enables either to be replaced without replacing the sensor.

The invention will not be described by way of example only, with reference to the illustrations in which like numerals represent like parts and in which:

DETAILED DESCRIPTION OF THE ILLUSTRATED EMBODIMENT

Figure 1:
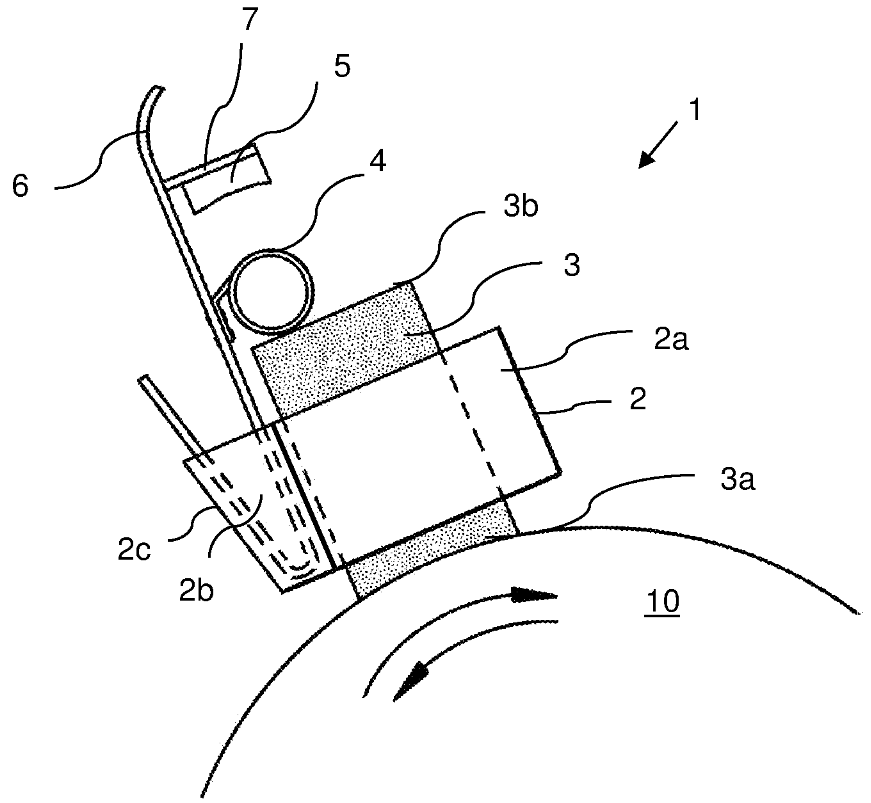
FIG. 1 shows a cross sectional view of an embodiment of the brush wear indicator and FIG. 2 shows a perspective view of the bracket as embodied within FIG. 1.
Figure 2:
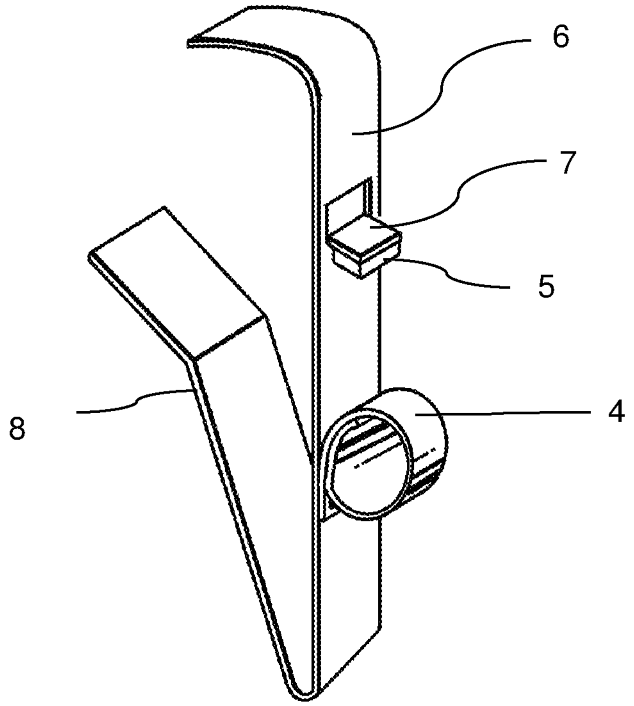

FIG. 1 shows a cross sectional view of an embodiment of the brush wear indicator generally designated 1. The indicator is made up of a holder 2, a brush 3, a coil spring 4, and a laser proximity sensor 5. The holder 2 is a brass tube having a rectangular cross section with two adjacent pockets 2*a* and 2*b*. One side 2*c* of the pocket 2*b* is sloped. Other material for the holder could be used though and these include aluminium, steel or polymers. The brush 3 fits inside the pocket 2*a* of the holder 2 and is able to move freely therein backwards and forwards from and to the rotating collector surface 10, which in this example is on a rotor of a generator. The brush 3 is a relatively tight fit within the pocket 2*a*, in order that movement within the pocket is not hindered by lateral forces which the brush experiences when in contact with a rotating collector surface 10, or a collector surface 10 which is moving laterally underneath the brush, or the brush moving with respect to the static collector surface 10. The brush 3 is a carbon brush. In use the holder 2 with the brush 3 therein is mounted adjacent the rotating collector surface 10 of a generator. As indicated by the arrows, the collector surface 10 may rotate both clockwise and anticlockwise. In some examples though the collector surface 10 rotates unidirectionally. In other examples the indicator 1 is substantially as described but the collector surface 10 is linear, such as that on a railway line. One end 3*a* of the brush 3 is positioned in contact with the collector surface 10 at a bearing surface of the collector surface 10 which is electrically conductive.

The brush 3 is in electrical communication with a power unit (not shown) and in use electrical power is delivered through wires (not shown) from the power unit to the brush 3 and then from the brush 3 to the collector surface 10. The current is transmitted through the brush by wires which are tamped, rivetted, soldered, bolted or clamped.

The coil spring 4 is a steel coil spring and has one end mounted to a bracket 6 adjacent the opposite end 3*b* of the brush 3. The spring 4 bears against the end 3*b* of the brush 3 and urges the end 3*a* of the brush 3 into engagement with the collector surface 10. As the collector surface 10 rotates it wears the end 3*a* of the brush 3 away. As the brush 3 wears away the spring uncoils as it does so, maintaining contact with the end 3*b* of the brush. The main coil of the spring 4 therefore moves with the end 3*b* of the brush 3. The distal surface of the spring 4 (i.e. the part from the spring farthest away from the collector surface 10), will also move but somewhat less, as expected from a coil spring that uncoils. It will be appreciated that in other examples where different types of springs are used, the degree of movement of the spring at one end compared to that of the other follows the same pattern.

Unchecked the spring 4 will continue to urge the brush 3 into engagement with the collector surface 10 until all of the brush 3 has worn away, thereby causing failure of the brush 3, at which point the electrical connection through the brush 3 to the collector surface 10 would be compromised and the electrical continuity lost.

In order to determine the wear on the brush 3 a laser proximity sensor 5 is mounted to a protrusion 7 at the distal end of the bracket 6, (that is the end farthest away from the collector surface 10). The sensor 5 is directed to the end 3*b* of the brush 3, but may also be directed to the distal surface of the spring 4. The sensor 5 measures the distance between the sensor 5 and the brush 3, or the spring 4, which ever it is arranged to do. As the brush 3 wears in use, the distance measured gets greater. The sensor 5 is in electrical communication with a central processing unit, which calculates the wear on the brush 3 from the distance measured. The wear data is transmitted by wires or wirelessly using conventional data transfer methodologies to a remote station, where the user can monitor the wear on the brush 3 or detect for failure.

The bracket 6 may simply bolt or clip onto a side of the holder 2. In the example shown the bracket 6 is "V" shaped, and is made of spring steel. The spring 4 and the sensor 5 are mounted on one side of the bracket 6 and the "V" portion 8 of the bracket 6 extends on the opposite side. In use the bracket 6 is inserted into the pocket 2*b* of the holder 2. The bracket 6 has a protrusion (not shown) which fits into a matching recess (not shown) in wall 2*c* the holder 2. In use the resiliently deformable portion deflects as the bracket 6 is introduced into the holder 2 until the recess and the protrusion engage, at which point the resilient nature forces a tight fit of the two parts together. The resilient nature of the bracket 6 makes sure that the protrusion is held within the recess and therefore that the bracket is held firmly against the inside of the pocket 2*b* of the holder 2. The bracket 6 is thus fixed in place and serves therefore to hold the spring 4 and the sensor 5 in position, whilst the spring 4 urges the brush 3 against the collector surface 10. Another benefit of the "V" shaped bracket 6 is that when the brush 3 requires replacement it can be simply clamped together therefore disengaging the protrusion from the recess, and pulled out, the brush 3 replaced and then reinserted, with the act of reinsertion causing the coiling of the spring 4 under tension as it does so, thereby forcing the brush 3 into engagement with the collector surface 10.

In another example of the invention there is an indicator substantially as described above, but the sensor 5 is mounted onto the end 3*b* of the brush 3. The sensor 5 is directed to the protrusion which is in a fixed position relative to the brush 3 and the sensor 5. In this case it is the sensor 5 that moves, but the distance measurement methodology is the same.

In another example of the invention there is an indicator substantially as described above, but the sensor 5 is mounted onto the spring 4. The sensor 5 is directed to the protrusion which is in a fixed position relative to the spring 4 and the sensor 5. In this case it is the spring 4/sensor 5 that moves, but the distance measurement methodology is the same.

It will be understood that the laser sensor 5 described above may be replaced for an ultrasound sensor 5.

The holder 2 described above is a radial type holder. The holder 2 used with the indicator may be of a number of different types however which are all provided as examples herein. In each example the indicator is substantially as described above but differs in the aspects that the holder is a trailing holder, reaction holder, tandem holder, cantilever holder, cartridge holder or calliper holder Whilst in the examples provided above the brush 3 is used for power transfer, it may also be used to transfer data in the form of electrical current from the collector surface 10 through the brush 3 and then to a data collection unit (not shown) and vice versa. The current in this sense therefore may be described as electrical signals.

In another example the indicator 1 is substantially as described above however the collector surface 10 is a linear U or V shaped track. The brush 3 and the holder 2 are mounted to a movable object such that the brush engages within the U or V shaped track and such that the brush 3 moves up and down the track laterally. This enables current and signal transfer between the part holding the collector surface and the part holding the holder 2 which are moving laterally with respect to one another. In this example there may be a plurality of tracks/collector surfaces and therefore a corresponding number of indicators engaged therein.

In another example of the invention there is an indicator 1 as described above except the collector surface is provided at least one electrically conductive ring on the top of a rotating door. The ring is centred on the central axle of the door. The indicator 1 is mounted to an arm above the door. The brush 3 is mounted within the holder 2 of the indicator 1. The brush 3 bears against the collector surface 10 as the door rotates, and current is transferred between the door and the indicator. This installation is typical in faceplate or flat slip ring in a rotating door.

What is claimed is:

1. A brush wear indicator comprising:

a brush holder;

a brush located within the brush holder;

a spring in contact with the at least one brush and configured to bias the brush against an electrically conductive collector surface, the spring and the brush being moveable in use;

a proximity sensor mounted to a non-moveable part of the indicator, said proximity sensor being configured to determine a distance from the proximity sensor to a movable portion of the spring;

the non-moveable part including a bracket supported by the holder;

the proximity sensor being in electrical communication with a CPU that is configured to determine an amount of wear that has occurred to the brush according to the distance determined by the sensor between the spring and the non-moveable part.

2. The brush wear indicator according to claim 1, wherein the proximity sensor and/or the spring are mounted on the bracket.

3. The brush wear indicator according to claim 1, wherein the bracket is attachable to the holder.

4. The brush wear indicator according to claim 1, wherein the bracket comprises a resiliently deformable portion mounted between inside surfaces of the holder.

5. The brush wear indicator according to claim 1, wherein the sensor is directed at a surface of the spring that is furthest from the collector surface.

6. The brush wear indicator according to claim 1, wherein the spring is any of a coil spring, a constant force spring, a "V" shaped clip spring, a bayonet spring, a sugar tong spring, a bobbin spring, a helical spring, a torsion spring, a calliper spring, a clock spring, and a cassette mechanism spring.

7. The brush wear indicator according to claim 1, wherein the proximity sensor is either a laser sensor or an ultrasound sensor.

8. The brush wear indicator according to claim 1, wherein the brush is a carbon brush.

9. The brush wear indicator according to claim 8, wherein the brush comprises a metal that increases its conductivity.

10. The brush wear indicator according to claim 1, wherein the brush is any of a monobloc brush, a multi-wafer brush, a multipart brush, a split brush, a wire brush, a calliper brush, and a fibre brush.

11. The brush wear indicator according to claim 1, wherein the holder is any of a radial holder, a trailing holder, a reaction holder, a tandem holder, a cantilever holder, a cartridge holder, and a calliper holder.

12. The brush wear indicator according to claim 1, wherein the collector surface is a surface of a generator, a motor, or a rotor.

13. The brush wear indicator according to claim 1, wherein the spring is a constant force extension spring formed as a multi-turn spiral coil of a flat ribbon of spring material.

* * * * *